United States Patent [19]

Sahara et al.

[11] 4,209,244
[45] Jun. 24, 1980

[54] LIGHT RESPONSIVE CAMERA ACTUATION CONTROL

[75] Inventors: Masayoshi Sahara, Sennan; Masaaki Nakai, Nara, both of Japan

[73] Assignee: Minolta Camera Kabushiki Kaisha, Osaka, Japan

[21] Appl. No.: 893,397

[22] Filed: Apr. 4, 1978

[30] Foreign Application Priority Data

Apr. 18, 1977 [JP] Japan .................................. 52/44939

[51] Int. Cl.² .................. G03B 7/08; G03B 17/18; G03B 17/40
[52] U.S. Cl. .................. 354/51; 354/60 R; 354/60 L; 354/238; 354/267
[58] Field of Search ............ 354/23 D, 60 R, 60 E, 354/60 L, 234, 235, 238, 266–268, 51, 48, 50

[56] References Cited

U.S. PATENT DOCUMENTS

| 3,106,882 | 10/1963 | Maitani | 354/47 |
| 3,690,228 | 9/1972 | Yamashita et al. | 354/49 |
| 4,126,874 | 11/1978 | Suzuki et al. | 354/60 R |
| 4,126,877 | 11/1978 | Ohtaki et al. | 354/267 X |

FOREIGN PATENT DOCUMENTS 2517811 10/1975 Fed. Rep. of Germany .

Primary Examiner—L. T. Hix
Assistant Examiner—William B. Perkey
Attorney, Agent, or Firm—Watson, Cole, Grindle & Watson

[57] ABSTRACT

In camera control circuitry including an exposure control circuit for controlling exposure factor or exposure factors, e.g. exposure time and/or diaphragm aperture, in accordance with an output of a light measuring circuit and further including an electromagnetic means for initiating the camera operation, a delay circuit delays the actuation of the exposure control circuit and the electromagnetic means for a short time period. A power supply circuit for the exposure control circuit, the light measuring circuit, the electromagnetic means and the delay circuit, is closed by the closure of a manually controlled switch and the closing condition of the power supply circuit is maintained through a self-maintaining circuit. When the scene brightness is outside of an available range for the exposure control circuit, a detecting circuit generates an output to make inoperative the delay circuit and the self-maintaining circuit so that the exposure control circuit and the electromagnetic means are not actuated. The delay circuit may also be used for self-timer photography.

14 Claims, 3 Drawing Figures

LIGHT RESPONSIVE CAMERA ACTUATION CONTROL

BACKGROUND OF THE INVENTION

1. Field of the Invention

The present invention relates to a device for preventing an automatic exposure control circuit from providing an incorrect exposure for a camera having an electromagnetic release mechanism.

2. Description of the Prior Art

In a known camera, when a scene brightness exceeds the camera's available control range, warning of it is made by, for example, a lamp that is lit before the shutter is released, or by locking the shutter release button so that the shutter may not be released.

Another known camera, which has an electromagnetic release mechanism, incorporates an advantage in that functions for remote control photography and/or self-timer photography can be easily provided by electrical means.

SUMMARY OF THE INVENTION

Accordingly, the primary object of the present invention is to provide a device for preventing exposure with the scene brightness outside of an automatic exposure control range in a camera including the aforesaid electromagnetic release mechanism.

According to the present invention, a camera is constructed such that at a first stage of shutter button depression power is supplied to a light measuring circuit and an indicating circuit, and at a second stage of shutter button depression the power supply to the light measuring circuit and an exposure control circuit controlled in accordance with the output of the light measuring circuit is self-maintained. The electromagnet for shutter release is actuated, and a signal is produced when the output of the light measuring circuit exceeds the exposure control range to release the aforesaid self-maintenance of the power supply and prevent shutter release operation by the electromagnet.

According to the present invention, the aforesaid functions are possible even when the shutter button is not directly operated by the user as in the case of remote control photography and/or self-timer photography.

Further according to the present invention, in a camera having an electromagnetic release mechanism and in which a delay circuit starts operation with the furnishing of power by the second power supply circuit, a signal is output after a lapse of a given time to release the shutter. A warning signal is issued to prevent the delay signal from being issued, thereby preventing the release operation by the electromagnet. Thus, the arrangement of the present invention dispenses with a particular shutter locking mechanism and a circuit for actuating the mechanism for the prevention of incorrect exposure, but the delay circuit itself is used to prevent incorrect exposure, so that the arrangement is less complex and causes no hindrance to the IC circuit thereof.

Other and further objects of this invention will become obvious upon an understanding of the illustrative embodiments to be described and as set forth in the appended claims, and various advantages not referred to herein will occur to those skilled in the art upon employment of the invention in practice.

DETAILED DESCRIPTION OF THE PREFERRED EMBODIMENTS

Figure 1:
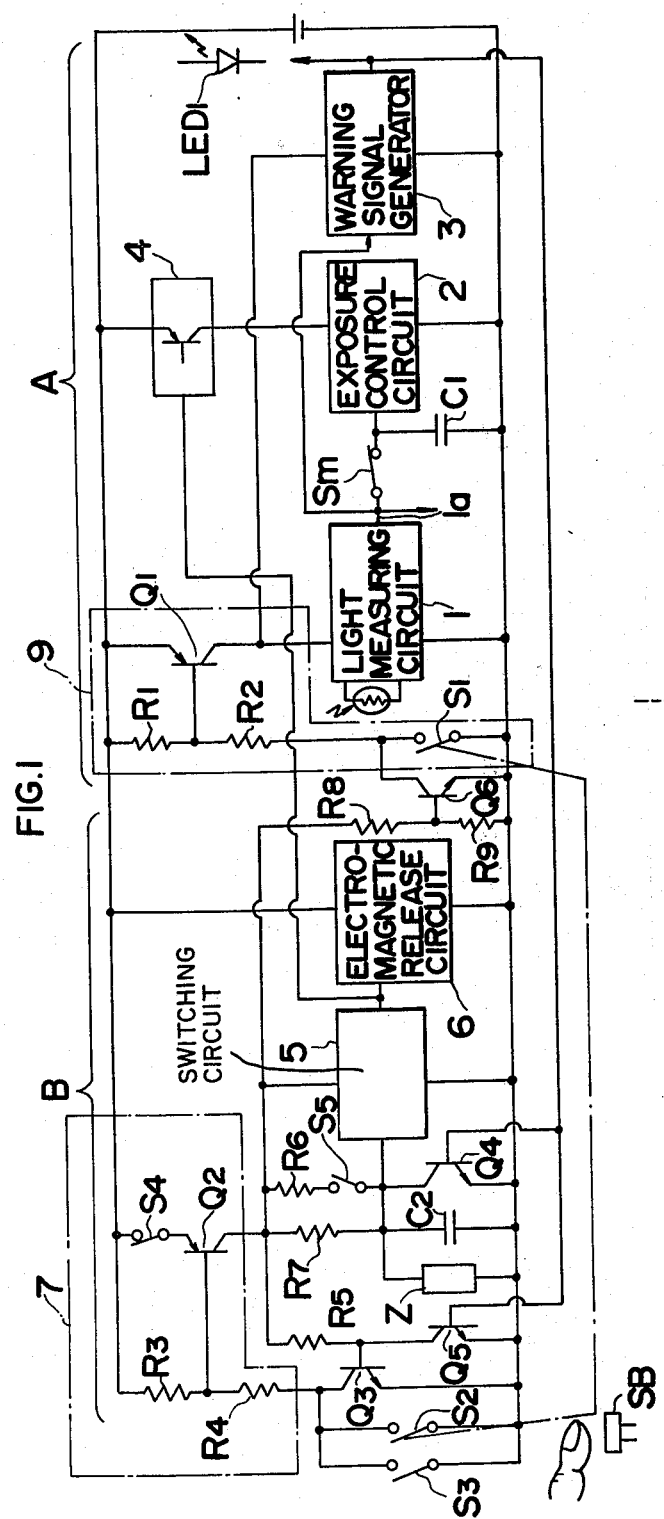
FIG. 1 is a circuit diagram of a preferred embodiment according to the present invention.

Referring to FIG. 1, portion A represents an automatic exposure control circuit for light measurement and exposure control. Light measuring circuit 1 measures scene light coming through a lens objective, performs known calculations with the measured light output and signals commensurate with exposure factors other than the scene brightness, and produces, through output terminal 1a, an output as a result of the calculations. The output of the light measuring circuit 1 is input through storing switch Sm to storing capacitor C1 and is also directly input to warning signal generating circuit 3 and an indicating circuit (not shown). In case the camera is of the diaphragm-priority automatic exposure time control type, exposure control circuit 2 starts counting exposure time commensurate with the signal voltage stored in the aforesaid storing capacitor C1, upon opening of the shutter, and closes the shutter after the termination of counting. In case the camera is of the shutter-speed priority automatic diaphragm control type, exposure control circuit 2 operates to determine the diaphragm aperture. Warning signal generating circuit or detecting circuit 3, includes as the main component element a voltage comparison circuit controlled by a differential amplifier, to generate an output signal when the signal from light measuring circuit 1 exceeds a high shutter speed limit (e.g. 1/2000 second), which is determined in accordance with the shutter mechanism in case of the diaphragm priority type camera. Furthermore, in case of the shutter speed priority type camera, warning signal generating circuit 3 detects whether or not an anticipated diaphragm aperture determined by the output from light measuring circuit 1 and an electrical signal commensurate with the preset shutter speed is within an available aperture range of the camera lens. A signal is produced when the anticipated diaphragm aperture is not within the available aperture range. For detecting if the anticipated diaphragm aperture is in the available aperture range or not, warning signal generating circuit 3 is constructed such that signals commensurate with the maximum and minimum diaphragm aperture of a lens mounted on the camera, as well as the signal representative of a preset shutter speed, may be applied thereto. The aforesaid signal from warning signal generating circuit 3 is applied to the bases of transistors Q4 and Q5, located in portion B in the Figure, for operation which is the main subject of the present invention to be described later. In portion A in the Figure, transistor Q1, resistors R1 and R2, and switch S1 form a first power supply circuit 9. When shutter button SB is depressed, switch S1 is closed at the first stage of the shutter button depression to turn on transistor Q1, causing power to be supplied to light measuring circuit 1, warning signal generating circuit 3 and the indicating circuit (not shown). Power supply circuit 4 is energized in response to a signal from a delay circuit (described hereinafter) for causing a delay of a certain period of time from the application of power until the light measuring circuit and associated circuit reach their stable operating condition for causing a delay for self-timer photography.

Portion B of FIG. 1 relates mainly to electromagnetic release of a shutter. Switching circuit 5, including a Schmidt circuit or a differential amplifier circuit, forms the aforesaid delay circuit together with resistors R6 and R7, and capacitor C2. This delay circuit starts counting a delay time immediately after it is supplied power by a second power supply circuit 7 consisting of transistor Q2, resistors R3 and R4, and switches S2 and S4. The delay time is determined by the time constant depending on the resistance of resistors R6 and R7 and the capacity of capacitor C2. After the lapse of the delay time, the output level of switching circuit 5 becomes high. The aforesaid delay time may be set in two ways by opening and closing switch S5. When switch S5 is closed, the delay time is short. The time in this case is set to a value, i.e. 15 millisecond, required for light measuring circuit 1 to reach its stable operating condition after application of power thereto. When switch S5 is opened, a delay time determined only by capacitor C2 and resistor R6 may be set to a value, i.e. 10 seconds, necessary for self-timer photography. The aforesaid second power supply circuit is constructed such that it supplies power to the delay circuit through transistor Q2 which is turned on (switch S4 is closed beforehand as mentioned later) when switch S2 is closed together with switch S1 at the first stage of the depression of shutter button SB.

Figure 2:
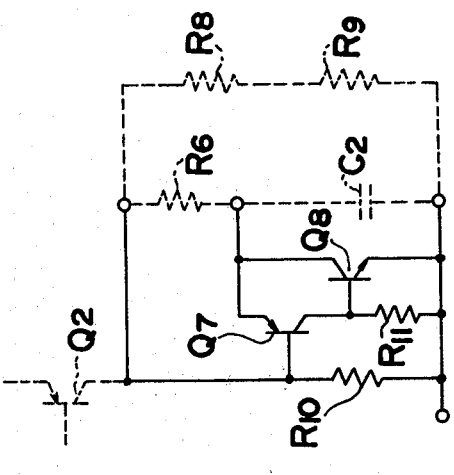
FIG. 2 is a detailed circuit diagram of block Z in FIG. 1.

The aforesaid high level output signal from switching circuit 5 is applied to power supply circuit 4 and electromagnetic circuit 6 which includes an electromagnet for initiating camera operation, e.g. releasing the shutter, and a circuit to energize the electromagnet, thereby actuating the camera mechanism for effecting film exposure. Transistor Q3 and resistor R5 form a self-maintaining circuit for the second power supply circuit. Transistor Q5 is connected across the base-emitter of transistor Q3 and transistor Q4 is connected in parallel with capacitor C2. Both transistors Q4 and Q5 are turned on by the signal from warning signal generating circuit 3 to thereby prevent the occurrence of the aforesaid delay time and release the self-maintaining condition of the second power supply circuit. In place of the main switch S1, a circuit comprising transistor Q6, resistors R8 and R9, actuates the second power supply circuit when the shutter button is not operated as in the case of self-timer photography or remote control operation. This circuit is closed when transistor Q2 is turned on, and transistor Q1 is made conductive when transistor Q6 is turned on. Switch S4 is opened in conjunction with the travel of a shutter closing member, i.e. the second curtain of a two curtain type slit shutter, and is closed after the completion of film winding. In place of switches S1 and S2, which are closed with the depression of shutter button SB, switch S3 may be closed by a remote control means to turn on transistor Q2 thereby further turning on transistors Q6 and Q1 (the first power supply circuit). Switch S3 may be a semiconductor switch or switch circuit operable in response to light or supersonic signal sent from a remote place. Block Z, connected in parallel to capacitor C2, is a switch circuit for discharging the electric charge of capacitor C2 after the termination of exposure. As shown in FIG. 2, this switch circuit includes transistors Q7 and Q8 and resistors R10 and R11. When transistor Q2 of the second power supply circuit is turned on, transistor Q7, the base of which is reverse-biased, is not conductive, and transistor Q8 is also blocked, so that capacitor C2 is not discharged. When transistor Q2 is turned off, transistor Q7 is turned on by capacitor C2, which has been charged, to turned on transistor Q8 to discharge the electric charge of capacitor C2.

The operation of the above circuit will now be explained, with the assumption that this circuit is of the diaphragm priority type. With shutter button SB depressed, switch S1 is closed to connect power to light measuring circuit 1 and warning signal generating circuit 3. When the shutter speed required for the scene light measured by the light measuring circuit with other exposure factors being taken account of, exceeds the high speed limit, a signal is issued from the warning signal generating circuit 3 to turn on transistors Q4 and Q5, and a visual warning is simultaneously given by light emitting diode LED 1, or the like, in a viewfinder (not shown). When switch S2 is closed at the second stage of shutter button depression, with no signal being issued from warning signal generating circuit 3 (indicating that correct exposure is possible), transistor Q3 is turned on since transistor Q5 is not conductive, so that transistor Q2 remains conductive and self-maintained conductive afterwards even when switch S2 is opened by the freeing of shutter button SB. Delay circuit 5 operates to actuate electromagnetic circuit 6 for shutter release after a lapse of the aforesaid delay time, thereby releasing the shutter. When switch S4 is opened after the termination of exposure, transistor Q2 is turned off and the self-maintaining circuit for the power supply is opened. When a signal is issued by warning signal generating circuit 3, transistors Q4 and Q5 are turned on even if switch S2 is closed, so that capacitor C2 is not charged, and no signal is issued from switching circuit 5 and the shutter is not released. Furthermore, as transistor Q3 is turned off due to the conductive condition of transistor Q5, transistor Q2 is turned off when switch S2 is opened by the freeing of shutter button SB, whereby power to the delay circuit is interrupted. That is, the self-maintaining circuit does not operate. Thus, without any hindrance to the camera operation, the camera is restored to its initial condition, i.e. the condition before the depression of the shutter button, and is ready for the next photographic operation, with the shutter release having been prevented, and the delay circuit having been inoperative (since capacitor C2 is not charged).

In case of remote control operation without depression of the shutter button, main switch S1 and switch S2 are not closed, but only switch S3 is closed to turn on transistor Q2, thereby turning on transistor Q1 through transistor Q6, so that light measuring circuit 1 and warning signal generating circuit 3 are energized. At this time, as a signal is issued by the aforesaid delay circuit including switching circuit 5, after a lapse of time required for light measuring circuit 1 to attain a stable operating condition, thereby releasing the shutter, the signal issued by warning signal generating circuit 3 makes transistors Q4 and Q5 conductive before the signal is issued by the delay circuit to prevent shutter release and the operation of the aforesaid self-maintaining circuit. The circuit is restored to its initial conditions immediately when switch S3 is opened. The above operation is the same in case of self-timer photography with switch S5 opened.

Figure 3:
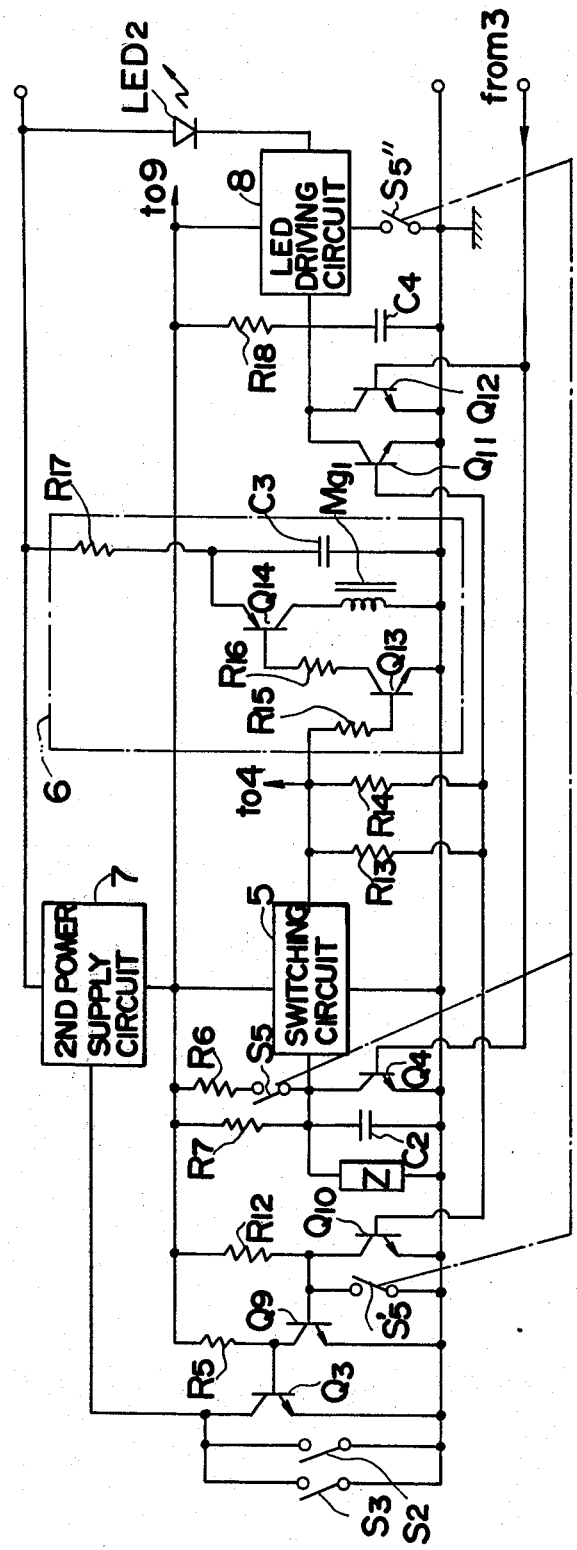
FIG. 3 is a circuit diagram of the essential portions of another preferred embodiment according to the present invention.

FIG. 3 is another embodiment according to the present invention, wherein the elements corresponding to portion A in FIG. 1 are the same and therefore omitted, and the portion of electromagnetic circuit 6 in FIG. 1 is shown in detail. Also, the same reference characters are used for the elements corresponding to those of FIG. 1. In the present embodiment, the light emitting member is flashed for the period from the start of time counted by the delay circuit to the release of the shutter, in case of self-timer photography, so that the progress of time counting may be recognized. When a signal is issued by warning signal generating circuit 3, the aforesaid shutter release operation and/or the self-maintaining circuit are prevented, and the light emitting member is not flashed.

Block 7 represents the second power supply circuit consisting of transistor Q2 and other elements as shown in more detail in FIG. 1. The portion comprising transistor Q14, electromagnet Mg1, capacitor C3, resistor R17, and transistor Q13, the base of which is connected through resistor R15 to the output terminal of switching circuit 5, is an electromagnetic circuit for shutter release. Capacitor C3 is always charged to the level of the power source voltage through resistor R17 when switching circuit 5 produces no output. When a high signal level is given by switching circuit 5, transistors Q13 and Q14 are turned on to rapidly discharge capacitor C3 through electromagnet Mg1, which is actuated by the discharged current to thereby release the shutter.

Block 8 forms a pulse oscillating circuit together with resistor R18, capacitor C4 and switch S5. Block 8 consists of an amplifier, which drives a uni-junction transistor and light emitting diode LED2, which may be viewed from the front of a camera. Capacitor C4 of the pulse oscillating circuit is connected in parallel with transistor Q12, which is turned on by the signal from the warning signal generating circuit, and transistor Q11 which is turned on by the signal from switching circuit 5. When either of these transistors is turned on, light emitting diode LED2 is turned off. Transistor Q9 is connected across the base-emitter of transistor Q3 which serves to self-maintain the power supply. Furthermore, switch S5' and transistor Q10 are connected in parallel with each other across the base-emitter of transistor Q9, with the base of transistor Q10 being connected through resistor R13 to the output terminal of switching circuit 5. Switches S5' and S5" are closed in ganged relation with the opening of switch S5 for self-timer photography. One of switches S5, S5' and S5" may be a contact switch and the other two may be semiconductor switches which operate in response to the signal from the contact switch.

In the embodiment of FIG. 3, at the first stage when switch S2 is closed by the depression of the shutter button, or when switch S3 is closed in response to remote control operation, the delay circuit operates to count time in the same manner as in FIG. 1, and the light measuring circuit (not shown in FIG. 3) reaches its normal operating condition at the latest before switching circuit 5 produces an output. When no signal is issued by warning signal generating circuit 3, switching circuit 5 produces an output, similar to that produced in FIG. 1, to actuate electromagnet Mg1 for shutter release, at the same time turning on transistors Q10 and Q11. When transistor Q10 is turned on to block transistor Q9 thereby turning on transistor Q3, power supply circuit 7 becomes self-maintained. After the termination of an exposure, the self-maintaining circuit is released similar to that of FIG. 1 (switch S4 connected in series with transistor Q2, which is omitted from block 7 in the diagram, is opened).

In case of self-timer photography, when switch S5 is opened with switches S5' and S5" being closed, transistor Q9 cannot be turned on, and transistor Q3 is turned on and becomes self-maintained upon closure of switch S2 or switch S3. Pulse oscillating circuit 8 is energized when power supply circuit 7 starts power supply operation, so that light emitting diode LED2 is flashed by the output from the pulse oscillating circuit 8. After a lapse of time set by the self-timer, a signal is issued from switching circuit 5 to release the shutter, with transistor Q11 being turned on to stop the pulse oscillating circuit, thereby causing LED2 to go out. When a signal is issued by warning signal generating circuit (circuit 3 in FIG. 1), transistors Q12 and Q4 are turned on, thereby causing light emitting diode LED2 to remain unlighted from the start so that a photographer may know that photographing conditions are incorrect. In the embodiment of FIG. 3, there is no element corresponding to transistor Q5 of FIG. 1 that is turned on by the output from warning signal generating circuit 3 to block transistor Q3 for preventing the operation of the self-maintaining circuit in FIG. 1. In the embodiment of FIG. 3, when a signal is issued from warning signal generating circuit 3 for ordinary photography, transistor Q4, connected in parallel with capacitor C2 of the time counting delay circuit, is turned on (in the same manner as in the embodiment of FIG. 1), to thereby prevent delay time counting. In this case, as transistor Q10 is not turned on unless a signal is issued by switching circuit 5, transistor Q9 is maintained conductive to thereby cause transistor Q3 to be blocked. The above conditions remain unchanged since no delay time counting is carried out, and power supply circuit 7 is blocked whenever switch S2 is opened when the shutter button is released. That is, the self-maintaining circuit does not operate.

Although the invention has been described in its preferred form with a certain degree of particularity, it is understood that the present disclosure of the preferred form may be changed in the details of construction, and the combination and arrangement of parts without departing from the spirit and the scope of the invention as hereinafter claimed.

What is claimed is:

1. Camera control circuitry, comprising:
   a light measuring circuit for generating an output representative of a scene to be photographed;
   electromagnetic means for initiating camera operation;
   an energization circuit for energizing said electromagnetic means;
   a power supply circuit for supplying electric energy to said light measuring circuit;
   a switch member for actuating said power supply circuit;
   a circuit for self-maintaining the actuated condition of said power supply circuit;
   a delay circuit for generating a first output signal when a given time period has lapsed after the actuation of said power supply circuit, said energization means being connected to said delay circuit to be energized by said first output signal and said power supply circuit being connected to said delay circuit to energize the latter;
   a detecting circuit for generating a second output signal when said output from said light measuring circuit exceeds a given limit; and means for preventing the operation of said delay circuit and said self-maintaining circuit in response to said second output signal.

2. The camera control circuitry as in claim 1 further comprising means for releasing the self-maintenance of said power supply circuit in response to the termination of the exposure.

3. The camera control circuitry as in claim 1 wherein said delay circuit includes a capacitor and a switching circuit for generating said first output signal when said capacitor is charged to a given level, and said prevention means includes a semiconductor switching element connected across said capacitor and is responsive to said second output to short-circuit said capacitor.

4. The camera control circuitry as in claim 3 wherein said self-maintaining circuit includes a first transistor shunted across said switch member, a second transistor having an output connected to the base of said first transistor to actuate the latter, and a biasing element for actuating said second transistor, said biasing element being actuated with either said switch member or said first transistor being conductive.

5. The camera control circuitry as in claim 4 wherein said prevention means includes a third transistor responsive to said second output signal to turn off said first transistor.

6. The camera control circuitry as in claim 4 wherein said self-maintaining circuit further includes means for actuating said first transistor in response to said first output.

7. The camera control circuitry as in claim 4 or 6 further comprising means for releasing the self-maintenance of said power supply circuit in response to the termination of the exposure.

8. The camera control circuitry as in claim 1 wherein said delay circuit includes a capacitor, a first resistor means for providing a given short time of delay, a second resistor means for providing a delay time necessary for self-timer photography, and selector means for selectively coupling said first and second resistor means with said capacitor.

9. The camera control circuitry as in claim 8 further comprising an indicator member, drive means for intermittently actuating said indicator member, and means for deactuating said drive means in response to said first output signal.

10. The camera control circuitry as in claim 8 further comprising means for deactuating said drive means in response to said second output signal.

11. Camera control circuitry, comprising:
a light measuring circuit for generating an output representative of a scene to be photographed;
an exposure control circuit for controlling at least one exposure factor;
an electromagnetic means for initiating camera operation;
an energization circuit for energizing said electromagnetic means;
a first power supply circuit for supplying electric energy to said light measuring circuit;
a first manually operable switch member for actuating said first power supply circuit;
a second power supply circuit;
a second switch member for actuating said second power supply circuit;
a circuit for self-maintaining the actuated condition of said second power supply circuit;
a delay circuit connected to said second power supply circuit to be energized thereby for generating a first output signal when a given time period has lapsed after the actuation of said second power supply circuit, said energization means and said exposure control circuit being connected to said delay circuit to be actuated by said first output signal;
a detecting circuit coupled to said light measuring circuit for generating a second output signal when said output from said light measuring circuit exceeds a given limit; and
means for preventing the operation of said delay circuit and said self-maintaining circuit in response to said second output signal.

12. The camera control circuitry as in claim 11 further comprising a third switch means arranged substantially in parallel with said first switch member for actuating said first power supply circuit, said third switch means being responsive to the actuation of said second power supply circuit.

13. The camera control circuitry as in claim 12 wherein said second switch member includes a first switch means responsive to a shutter release operation, and a second switch means responsive to a remote control operation, said first and second switch means being connected parallelly with each other to said second power supply circuit.

14. Camera control circuitry comprising:
a power source;
a light measuring circuit, having an output terminal, for generating an exposure control signal corresponding to the scene brightness;
first switch means actuated at a first stage of shutter button depression;
a first power supply circuit connected to said power source to form a power supply path to said light measuring circuit in response to the actuation of said first switch means;
a second switch means which is actuated at a second stage of shutter button depression;
a second power supply circuit connected to said power source and having an output terminal for providing electric energy therethrough, the second power supply circuit being actuated to a power supply state in response to the actuation of said second switch means;
a delay circuit receiving electric power from said output terminal of said second power supply circuit, and for generating a first output signal when a given time period has lapsed after the actuation of said second power supply circuit;
electromagnetic means for initiating a shutter operation;
an energization circuit for energizing said electromagnetic means in response to said first output signal, said energization circuit being connected with said output terminal of said second power supply circuit to receive electric power therefrom;
a circuit for self-maintaining the actuated state of said second power supply circuit;
a detecting circuit having an input terminal connected to said output terminal of said light measuring circuit, and an output terminal for generating a second output signal when said exposure control signal exceeds a given level;
means for preventing the operation of said delay circuit and self-maintaining circuit with occurrence of said second output signal, said preventing means functionally connected to said output terminal of said detecting circuit;
a third switch connected in parallel with said second switch means to said second power supply circuit for actuating the latter independently of said second switch means; and
a fourth switch means for actuating said first power supply circuit in response to the actuation of said second power supply circuit.

* * * * *